United States Patent
Bunnell et al.

(10) Patent No.: US 9,607,072 B2
(45) Date of Patent: Mar. 28, 2017

(54) SYSTEM AND METHOD FOR IMPLEMENTING NESTED RELATIONSHIPS WITHIN A SCHEMALESS DATABASE

(71) Applicant: Stretchr, Inc., Longmont, CO (US)

(72) Inventors: Tyler Bunnell, Salt Lake City, UT (US); Mat Ryer, Lafayette, CO (US)

( * ) Notice: Subject to any disclaimer, the term of this patent is extended or adjusted under 35 U.S.C. 154(b) by 309 days.

(21) Appl. No.: 14/522,487

(22) Filed: Oct. 23, 2014

(65) Prior Publication Data
US 2015/0178365 A1    Jun. 25, 2015

Related U.S. Application Data

(60) Provisional application No. 61/918,638, filed on Dec. 19, 2013.

(51) Int. Cl.
  *G06F 17/30*    (2006.01)
  *H04L 29/08*   (2006.01)

(52) U.S. Cl.
  CPC .... *G06F 17/30584* (2013.01); *H04L 67/1008* (2013.01); *H04L 67/1014* (2013.01)

(58) Field of Classification Search
  CPC .................................................. G06F 17/30587
  See application file for complete search history.

(56) References Cited

U.S. PATENT DOCUMENTS

| | | | | |
|---|---|---|---|---|
| 2003/0009536 A1* | 1/2003 | Henderson | ............. | G06Q 10/10 709/219 |
| 2004/0128224 A1* | 7/2004 | Dabney | ................. | G06Q 30/08 705/37 |
| 2008/0016094 A1* | 1/2008 | Takano | ............... | G06F 17/2229 |
| 2011/0107241 A1* | 5/2011 | Moore | ................ | G06F 17/3089 715/760 |
| 2013/0332195 A1* | 12/2013 | Galuten | ............. | G06F 19/3493 705/3 |
| 2015/0134707 A1* | 5/2015 | Doherty | ................... | G06F 8/34 707/806 |

OTHER PUBLICATIONS

Bloehdorn, Stephan, et al. "Tagfs-tag semantics for hierarchical file systems." Proceedings of the 6th International Conference on Knowledge Management (I-KNOW 06), Graz, Austria. vol. 8. 2006.*

* cited by examiner

*Primary Examiner* — William Spieler
(74) *Attorney, Agent, or Firm* — John Laurence; W.R. Samuels Law

(57) ABSTRACT

A system for nested relationships from a schemaless database, comprising a client running an application which generates database access requests over a public or private network, a load balancer running an application which distributes the incoming database access requests from the clients across one or more API servers, and a load balancer running an application which distributes incoming database access requests from the one or more API servers across one or more database servers. The database servers implementing one or more schemaless databases across which one or more database models are distributed and the one or more API servers implementing for accessing the one or more database servers in a manner which implements nested relationships within the one or more schemaless databases in response to the incoming database requests from the load balancer.

2 Claims, 3 Drawing Sheets

SYSTEM AND METHOD FOR IMPLEMENTING NESTED RELATIONSHIPS WITHIN A SCHEMALESS DATABASE

FIELD OF THE INVENTION

The present invention relates to a system and method for implementing nested relationships between documents stored within one or more collections on a schemaless database.

BACKGROUND OF THE INVENTION

In a standard schema based database, a one-to-many relationship may be implemented where a single document (parent) is related to zero, one or more other documents (children) within the database. This allows for information common to many documents to be represented in one place, rather than being repeated for each document. This results in lower storage needs as well as the ability to modify the common information once, rather than in every document to which it relates.

A schemaless database stores and retrieves data using data models other than strict tabular relations which are generally required in standard schema based databases. As a result, schemaless databases offer greater simplicity of design, greater horizontal scaling and finer control over availability. The schemaless database is often a highly optimized key-value type of storage intended for simple retrieval and appended operation. This type of storage provides significant performance benefits in terms of minimizing latency and increasing throughput. The schemaless database is timing increasing use in the big-data and in web application industries were this type of performance is necessary.

However, a schemaless database does have certain limitation compared to standard schema database which inherently implements tabular relations. In a standard schemaless database, a document consists of one or more key-value pairs that are stored in a collection database. A document has an identification (ID) string which uniquely identifies the document within a collection. However, due to the technology limitations of a schemaless database, while a collection may contain one or more documents, it cannot contain other collections. As a result, it is not possible to relate documents in a one-to-many relationship.

Therefore, the problem with schemaless databases is that they do not provide for nested relationships between documents stored within one or more collections.

DEFINITIONS

The following definitions are provided for convenience and are not to be taken as a limitation of the present invention.

A schemaless database refer to a type of database that does not have an intrinsic concept of relationships, this type of database being typically implemented as a key-value data model.

A database refers to a single or clustered computer server environment made up of both physical and/or virtual machines running, among other things, database software services.

An API server refers to a single or clustered computer server environment made up of both physical and/or virtual machines running, among other things, a dedicated compiled program implementing the methods of the present invention.

A key refers to a set of characters used to locate and retrieve a value on a storage medium comprising a database.

A value refers to data stored on and retrieved from a storage medium comprising a database.

A document refers to one or more key-value pairs of data.

A parent refers to a key that has a value consisting of one or more child keys.

A child refers to a key that has a value consisting of data and is associated with a parent.

A sibling refers to a child key that exists alongside other children with the same parent.

A string refers to a series a characters.

A collection refers to a grouping of documents within a single schemaless database, the documents within a collection typically having a similar or related purpose and each document possibly having different data fields.

A nested relationship refers to a key-value pair in which the value refers to a collection rather than document.

SUMMARY OF THE INVENTION

It is the primary purpose of the present invention to obviate the above-described problem by providing a system and method for implementing nested relationships between documents stored within a schemaless database.

In addition to the foregoing, other features, objects and advantages of the present invention will become apparent from the following description.

BRIEF DESCRIPTION OF THE DRAWINGS

The following detailed description, given by way of example and not intended to limit the present invention solely thereto, will best be appreciated in conjunction with the accompanying drawings in which.

DETAILED DESCRIPTION OF THE INVENTION

Figure 1:
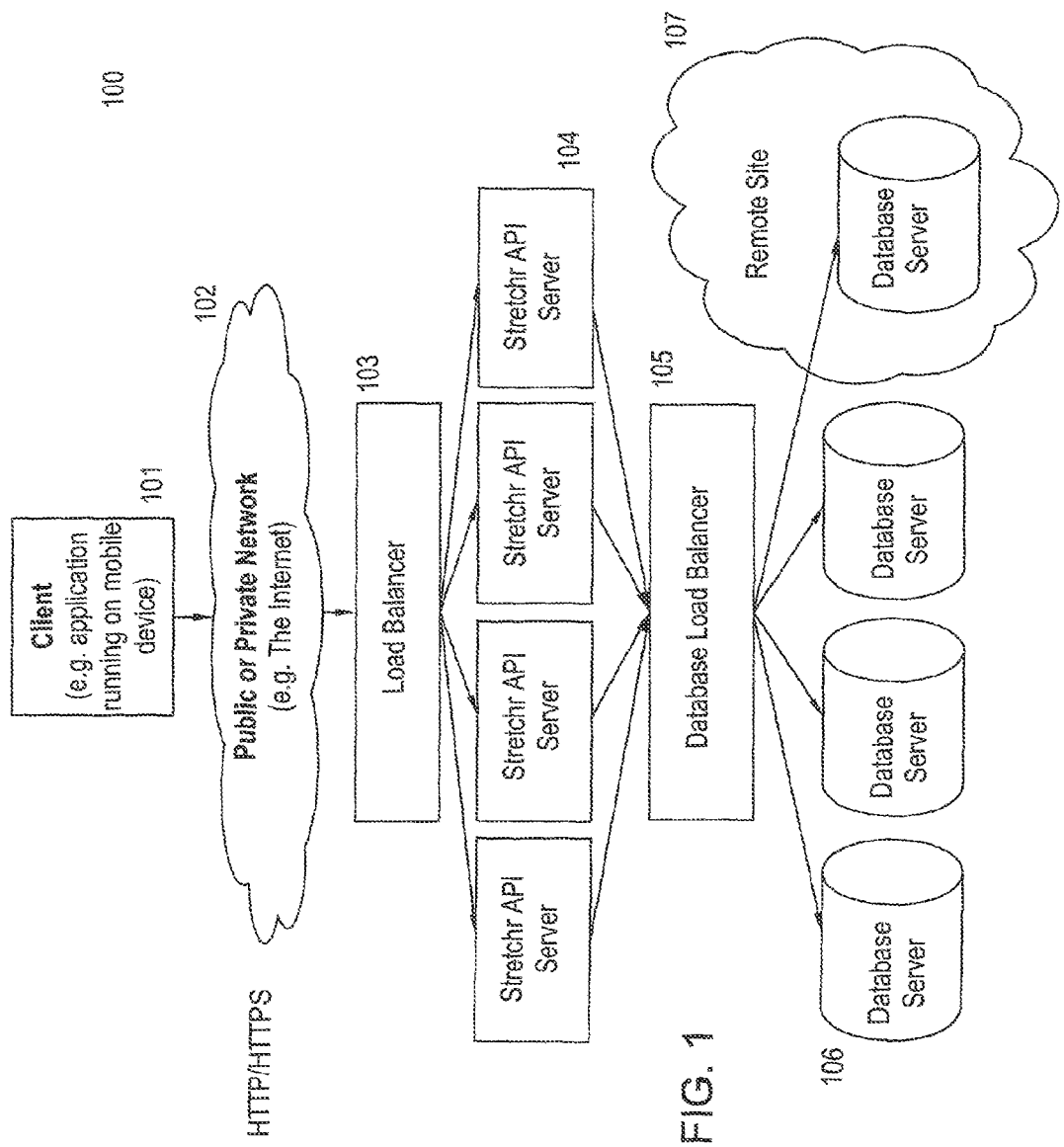
FIG. 1 is a functional block diagram depicting a system infrastructure for implementing a system and method for implementing nested relationships within a schemaless database according to an exemplary embodiment of the present invention.

The present invention relates to a system and method for implementing nested relationships between documents within one or more collections stored within a schemaless database.

The present invention addresses the limitations of schemaless databases by providing relationship capabilities in the form of nested relationships. Typically, in a schemaless database, data is stored in a key-value pair manner, with no concept of relationships between data. Any relationships between data must be explicitly maintained by the developer. Nesting is the ability to associate a parent with a child. The child can also be the parent of another child. This nesting can be done an unlimited number of times. Parents and children are associated with each other by appearing in a string delimited by a defined delimiter character.

The system and method of the present invention provides for a document or collection of documents that have nested relationships using a defined path, such as a Uniform Relation Locator (URL) path as described in RFC 1738. A path is a string of segments separated by a delimiting character, such as a forward-slash character ("/") in a URL, where each segment is considered to be a child of the segment before it.

A path is made up of two types of segments, a collection path segment ("Tc") that refers to a collection of documents and a document path segment ("Tid") that refers to a string ID of a document stored in a collection on a schemaless database.

A path alternates between a collection path segment ("Tc") and a document string identification ("Tid") segment. The segment types within a path may be determined using a zero-bound determination the index position of a segment within a path.

Specifically, where the zero-bound value of a segment's index position ("i") within a path equals zero ("i % 2=0"), that path segment refers to a collection path segment ("Tc"). Alternatively where the zero-bound value of a segment's index position ("i") within the path equals one ("i % 2=1"), that path segment refers to a document string ID ("Tid").

As an example, assuming a backslash ("/") as the delimiter character, the segment types within the path "/books/1/chapters/2/words/3," are identified in the following table.

| Index Position (i) | Segment | i % 2 | Segment Type | Description |
|---|---|---|---|---|
| 0 | books | 0 | Tc | Collection called "books" |
| 1 | 1 | 1 | Tid | Document in collection "books" with ID "1" |
| 2 | chapters | 0 | Tc | Collection called "chapters" |
| 3 | 2 | 1 | Tid | Document in collection "chapters" with ID "2" |
| 4 | words | 0 | Tc | Collection called "words" |
| 5 | 3 | 1 | Tid | Documents in collection "words" with ID "3" |

In order to support nested data such as a collection of documents (children) relating to a single document in the same or another collection (parent), the system and method of the present invention changes the datastore ID of a document stored within a database to encode information of relationships to parent and grandparent resources, while also maintaining the document's distinct ID within the database. These changes to datastore IDs is abstracted from the client, who is unaware of it when storing and accessing documents.

In FIG. 1, a functional block diagram of a system infrastructure for implementing a system and method for implementing nested relationships within a schemaless database according to the present invention, is illustrated. As shown in FIG. 1, the system 100 includes one or more clients 101, a public or private network 102, a load balance 103, one or more API servers 104, a database load balancer 105, one or more local database servers 106 and one or more remote database servers 107.

The clients 101 are one or more CPU based desktop computers or mobile devices having access to the public or private network 102 and running an application capable of generating requests for access to the local database servers 106 and the remote database servers 107.

The public or private, network 102 is any network infrastructure capable of providing the clients 101 access to the load balancer 103 using any pre-defined network protocol.

The load balancer 103 is one or more CPU based computers programmed to distribute any number of incoming requests from the clients 101 across the one or more API servers 104 according to a pre-defined algorithm.

The API severs 104 are one or more CPU based computers, each computer running an application which implements a method for accessing the database servers 106 in a manner which implements nested relationships in response to requests routed to each of the API servers 104 from the load balancer 103.

The load balancer 105 is one or more CPU based computers programmed to distribute any number of incoming requests from the API servers 104 across the local database servers 106 and the remote database servers 107 according to a pre-defined algorithm.

The local database servers 106 and the remote database servers 107 are one or more schemaless databases across which one or more database models are distributed.

Figure 2:
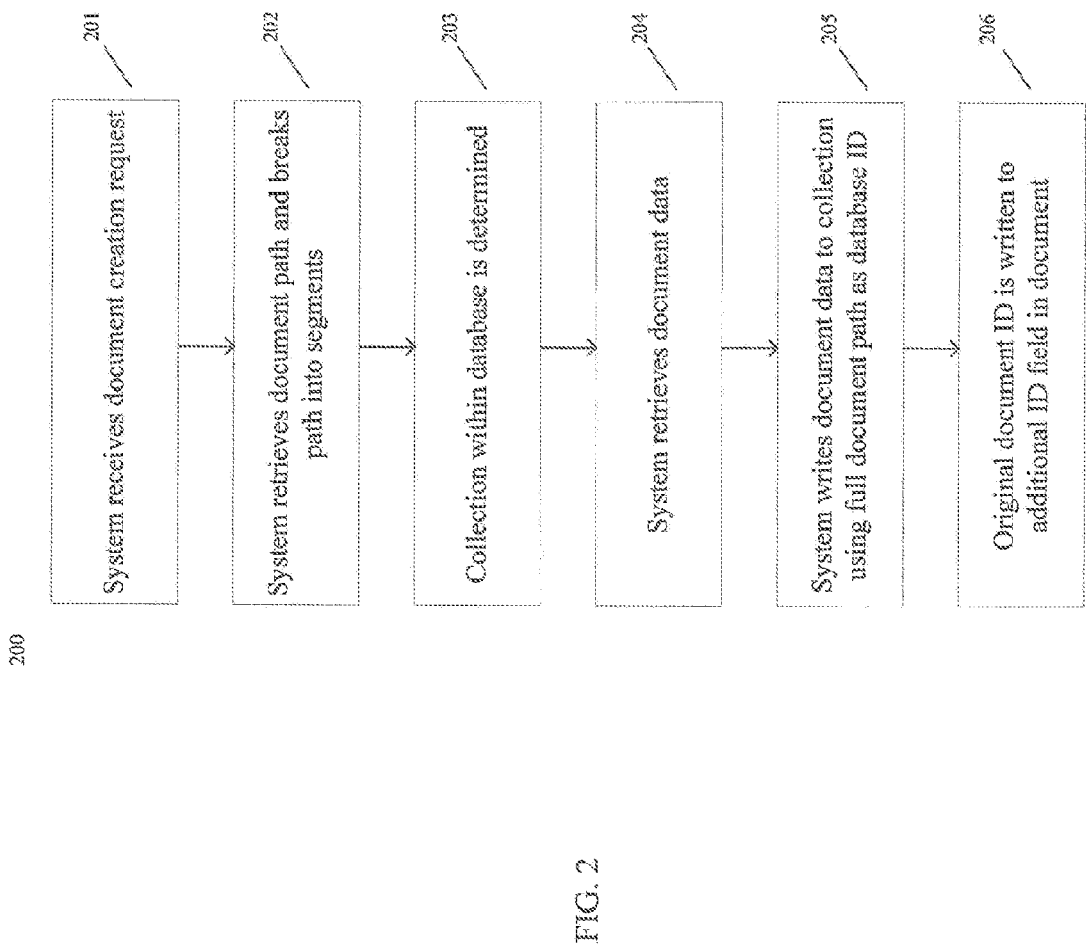
FIG. 2 is a functional block diagram depicting the creation of a document within a system and method for implementing nested relationships within a schemaless database according to an exemplary embodiment of the present invention.

In FIG. 2, a functional block diagram depicting the creation of a document in a system and method for implementing nested relationships within a schemaless database according to the present invention, is illustrated. As shown in FIG. 2, in step 201, the document creation method is initiated when the system receives a document creation request from a client which includes both document data and a document path. The document path is configure by the user to reflect the nested relationships the newly created document is to have with other existing documents and with one or more collections within the database.

In step 202, the document path is retrieved from the received request and is broken up into individual segments. As an example, the retrieved document path "books/1/chapters/2" is broken up into a collection segment named "books," a document string ID segment named "1," a collection segment named "chapters," and a document string ID segment named "2."

In step 203, the collection within the database to which document data is to be written is determined. Specifically, the target collection is determined by the penultimate segment of the retrieved document path. As an example, for the retrieved document path "books/1/chapters/2," the target collection is determined to be the collection segment named "chapters."

In step 204, document data is retrieved from the received request.

In step 205, the retrieved document data is written to the target collection within the database. The retrieved document path is used as the document's actual database ID. As an example, for the document whose retrieved document path is "books/1/chapters/2," the database ID for that document on the database will be "books/1/chapters/2."

Lastly, in step 206, an additional ID field is automatically added to the saved document data, the additional ID field containing the document's original database ID. As an example, for the retrieved document path "books/1/chapters/2," the document ID "2" is written to the additional ID field of that document.

Figure 3:
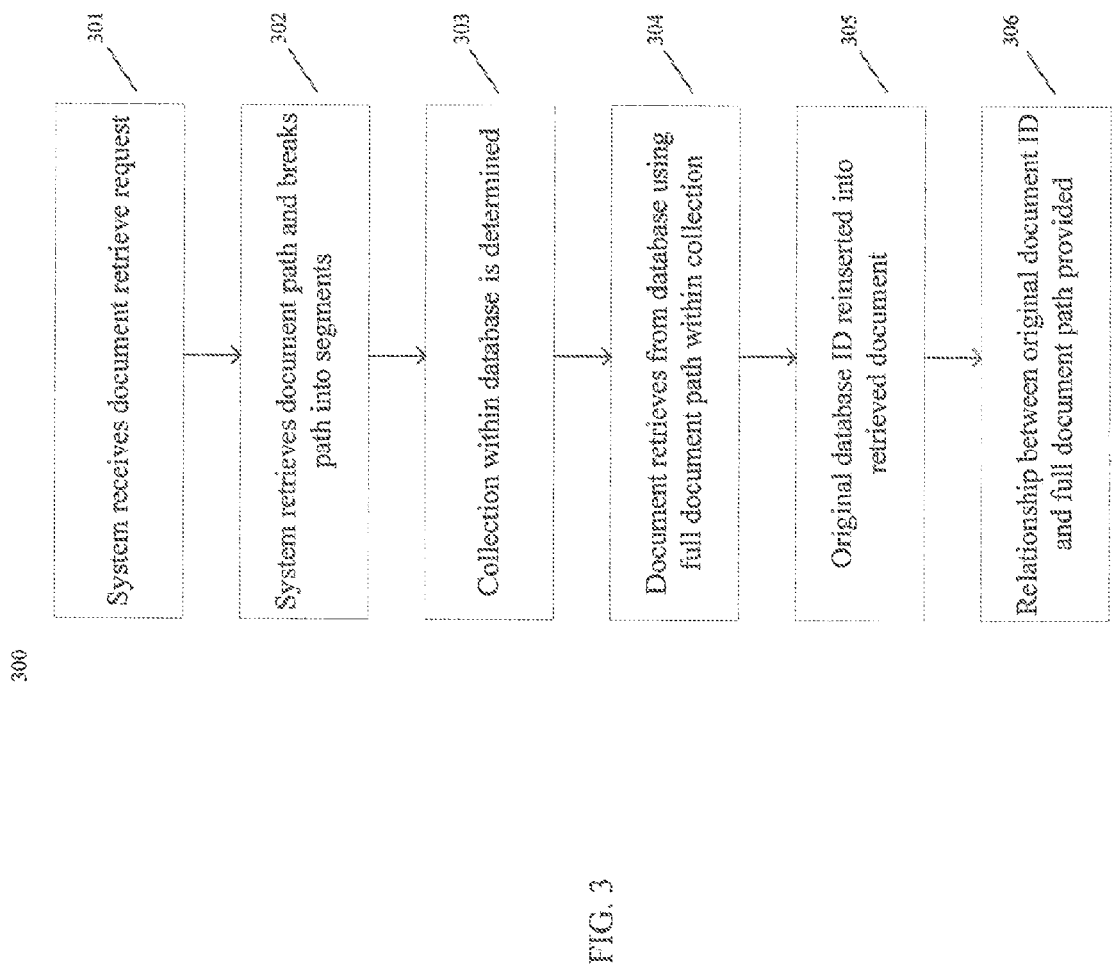
FIG. 3 is a functional block diagram depicting the retrieval of a document in a system and method for implementing nested relationships within a schemaless database according to an exemplary embodiment the present invention.

In FIG. 3, a functional block diagram depicting the retrieval of a document in a system and method for implementing nested relationships within a schemaless database according to the present invention, is illustrated. As shown on FIG. 3, in step 301, the document retrieval method is initiated when the system receives a document retrieval request from a client which includes the document path of the document to be retrieved.

In step 302, the document path is retrieved from the received request and is broken up into individual segments. As an example, the retrieved document path "books/1/chapters/2" is broken up into a collection segment named "books," a document string ID segment named "1," a collection segment named "chapters," and a document string PD segment named "2."

In step 303, the collection within the database from which document data is to be retrieved is determined. Specifically, the target collection is determined by the penultimate segment of the retrieved document path. As an example, for the retrieved document path "books/1/chapters/2," the collection is determined to be the collection segment named "chapters."

In step 304, the received document path in full is used to refer to a document database ID within the determined target collection within the database.

In step 305, the stored document's database ID is removed and replaced with the original database ID stored in that document's additional ID field and the document data retrieved from the database is then transmitted to the client along with the original database ID.

Lastly, in step 306, the relationship between the document's original database ID and the document path used as that document's database ID is optionally made available to the client.

The nested relationships stored in the database ID provides for the ability to associate a parent with a child. The child can also be the parent of another child. This nesting can be done an unlimited number of times. Parents and children are associated with each other by appearing in a string delimited by a delimiter character.

As an example, assume the following entries are written to a blank database:
"/people/tyler,"
"/people/mat," and
"/people/ryan."

The above three entries show how nesting provides a relationship based model for interacting with data in a schemaless database. The parent, "people" now has three children. The three children are considered siblings of the same parent. If a query is made requesting the value of "/people", a value would be returned containing all three children, namely "tyler," "mat" and "ryan."

As a further example, assume the following three entries are written to a blank database:
"/people/tyler/books/1984,"
"/people/mat/books/the magic of reality," and
"/people/ryan/books/ruby programming for dummies."

Having written the above-entries to the database, it is possible to issue a query requesting the value of "/books". All children with the same parent are related, thus the database IDs of all three books would be returned, namely the database IDs of "1984," "the magic of reality" and "ruby programming for dummies." though they have different grandparents, namely "tyler," "mat" and "ryan," respectively.

As a farther example, the following four entries are written to a blank database:
"/people/tyler/books/1984/chapters/one,"
"/people/tyler/books/no more mr. nice guy/chapters/one," and
"/people/tyler/books/iron john/chapter/one."

Having written the above-entries to the database, it is possible to issue a query requesting the value of "/tyler/chapters." Due to the relationships in place, all chapters for all books that belong to "tyler" will be retrieved.

Of course "/chapters" would retrieve all chapters for all books for all people. This demonstrates that the nesting invention allows for fuzzy matching of relationships across siblings at any level of descendancy.

As a further example, the following two entries are written to a blank database:
"/countries/uk/cities/London," and
"/countries/uk/cities/manchester."
If a query for "/countries/uk" is performed now, there will be no documents returned since the collection "countries/uk" does not yet exist.
If the entry "/countries/uk" is subsequently written to the database, the previously written "/cities/london" and "/cities/manchester" resources become linked to the subsequently written "/countries/uk" resource because this resource is included in the database ID path of the original entries. As a result, a subsequent query for "/countries/uk" will now return the "/cities/london" and "/cities/manchester" resources.

The description of the present disclosure has been presented for purposes of illustration and description, but is not intended to be fully exhaustive and/or limited to the disclosure in the form disclosed. Many modifications and variations in techniques and structure will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of the present disclosure.

The invention claimed is:

1. A method of writing a document with nested relationships to a schemaless database, the steps including:
   receiving a document creation request that includes document data and a document path;
   partitioning the received document path into individual segments separated by a delimiter, the individual segments including collection segments and document identification string segments;
   determining the target collection by identifying the individual segment that is the penultimate segment of the retrieved document path;
   writing the document data to the target collection on the database using the received document path in full as the document's actual database identification; and
   writing an additional ID field to the saved document data, the additional ID field containing the document's original actual database identification.

2. A method of reading a document with nested relationships from a schemaless database, the steps including:
   receiving a document retrieval request which includes a document path of a document to be retrieved;
   partitioning the document path into individual segments separated by a delimiter, the individual segments including collection segments and document identification string segments;
   determining a target collection by identifying the individual segment that is a penultimate collection segment within the document path;
   retrieving document data from the target collection using the document path as a database identification for a document within the target collection;

replacing the database identification for the document within the document data with an original database identification stored in an additional field within the document;

transmitting the document data with the original database identification;

providing information on the relationship between document path used to retrieve the document and the original database identification of the document.

* * * * *